No. 607,525. Patented July 19, 1898.
G. H. F. SCHRADER.
TIRE VALVE AND PUMP COUPLING.
(Application filed May 18, 1895.)
(No Model.)
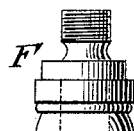
FIG. 1.
FIG. 2.
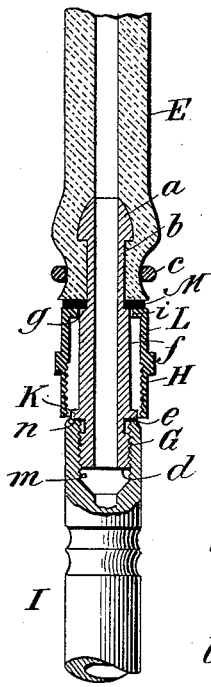
FIG. 3.
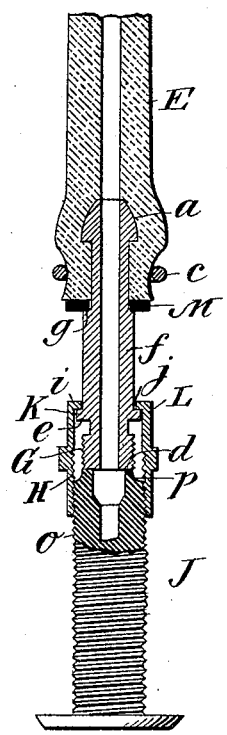
FIG. 4.
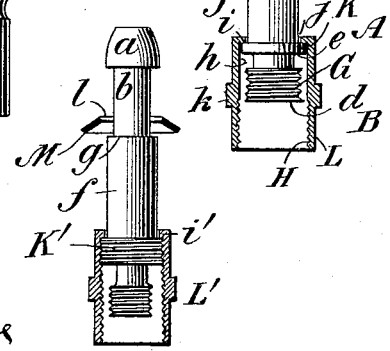
WITNESSES:
Fred White
Thomas F. Wallace
INVENTOR:
George H. F. Schrader,
By his Attorneys,
THE NORRIS PETERS CO., PHOTO-LITHO., WASHINGTON, D. C.

UNITED STATES PATENT OFFICE.

GEORGE H. F. SCHRADER, OF NEW YORK, N. Y.

TIRE-VALVE AND PUMP-COUPLING.

SPECIFICATION forming part of Letters Patent No. 607,525, dated July 19, 1898.

Application filed May 18, 1895. Serial No. 549,740. (No model.)

*To all whom it may concern:*

Be it known that I, GEORGE H. F. SCHRADER, a citizen of the United States, residing in the city, county, and State of New York, have invented certain new and useful Improvements in Tire-Valves and Pump-Couplings and the Like, of which the following is a specification.

This invention relates to couplings especially applicable to the discharge-pipe of a pneumatic pump for coupling it to the tire-valve of a bicycle and aims to provide an improved coupling for this or like purposes.

Tire-valves are usually constructed with either an internally-screw-threaded socket into which the pump-coupling is screwed or an externally-screw-threaded body over which the coupling is screwed, the coupling in one case consisting of a tubular member having a male screw-thread and in the other case of a like member having a female screw-thread. Either coupling has been capable of use only with the corresponding tire-valve, and as valves of both constructions are in general use it has been necessary for bicyclers, in case of accidental deflation of their tires, to obtain a pump having the particular coupling adapted to the valve used by them before the tire could be again inflated.

My invention aims to produce a coupling capable of use either as a male or female coupling, effective as either, and readily convertible from one into the other, whereby the air-pump of any rider can be employed by any other rider and the one coupling can be used with all pumps.

To this end in carrying out my invention I provide a coupling which is universal or capable of more than one use, having both male and female coupling provisions, as screw-threads consisting of two parts, the one carrying one of these provisions and the other carrying the other, and I construct these parts relatively movable, so that when one is used the other is moved out of the way, and I provide certain other improvements in the coupling and in its attachment to the pump-hose, all as will hereinafter be fully set forth.

In the accompanying drawings, which show certain adaptations of my invention, Figure 1 is an elevation, partly in axial section, of the pump-pipe for an air-pump, showing the preferred form of my improved coupling applied thereto, partly in elevation and partly in axial section. Fig. 2 is a fragmentary axial section thereof, showing a fragment of a tire-valve having a female socket to which the coupling is applied. Fig. 3 is a similar view showing an externally-screw-threaded tire-valve to which the coupling is applied, and Fig. 4 is a side elevation, partly in axial midsection, showing a modified form of coupling and showing the hose-washer before being bent to its final position.

Referring to Figs. 1, 2, and 3, I will first describe the preferred form of my invention as therein shown. In these figures, A is the coupling; B, its outer end; C, its body; D, its hose end; E, a rubber hose or other device permanently attached to the coupling, and F a nipple carried thereby, by which the coupling may be connected to an air-pump or other suitable feeder. The hose E and nipple F are usually firmly attached to a pump and constitute part thereof, and the coupling A has at its hose end a nipple-like construction consisting of a head $a$ and neck $b$, over which the hose passes and against which latter it is permanently clamped by a ring or wire $c$. As thus far described the parts are of well-known form and may be of any suitable construction.

According to the preferred form of my invention the coupling has two provisions, one a male screw-thread G and the other a female screw-thread H, the latter larger than the former and surrounding and concentric with it, by one of which threads the coupling can be fastened to the female socket of the tire-valve, such as I, (shown in Fig. 2,) and by the other of which the coupling can be fastened to the male threads of a tire-valve, such as J, that shown in Fig. 3. The male thread G is formed on or near the lower end of the tubular body of the coupler, which body has a seating face or end $d$ outwardly of this thread and a seating-face $e$ inwardly thereof, the latter face being preferably formed on the outer wall of an annular shoulder K, formed on the body C and terminating an elongated cylindrical portion $f$, constituting the intermediate part of the body, which at its inner extremity meets a shoulder $g$ between this portion and the neck $b$. The thread H is formed on the cylindrical interior of a sleeve L, which is rotative and movable on the body C and when in the active position incloses and projects beyond the thread G and when in the inactive position is inwardly of and exposes this thread. The sleeve L embraces the shoulder K and has an inner cylindrical portion $h$, surrounding this shoulder, and an inwardly-projecting flange $i$, embracing the inner side of the shoulder and traversed by an axial hole $j$, fitting over the cylinder $f$ of the body and sliding thereon. Externally the sleeve has any suitable provision for grasping and holding it—as, for example, the handle portion $k$. The relative diameters of the screws G and H may be proportioned as desired so long as the one is concentric of and can move axially through the other.

My invention provides also a washer M, which is permanently secured on the neck $b$ and limits the insertion of the neck into the pipe E. This washer also limits the inward movement of the sleeve L on the body in the construction shown, preferably arresting the sleeve with its outer edge slightly inward from the face $e$, as seen in Fig. 2. This washer is originally distorted, as shown in Fig. 4, until the hole $l$ through it is large enough to pass over the head $a$ of the coupling, and then the washer is flattened and contracted until this hole is too small to permit the removal of the washer from the neck $b$.

In operation the two parts of the coupling being inseparable will remain loosely connected in any position until required for use. Then if the valve to which the coupling is to be fastened is one having an internal thread the sleeve L will be moved to the inactive position and the male thread G will be screwed into the socket $m$ of the valve until the seating-face $e$ of the coupling makes a tight fit with the corresponding face $n$ of the valve. Air can then be forced through the coupling without leakage. The coupling can be detached by simply unscrewing. If the valve is of the construction shown in Fig. 3, the sleeve L will be projected outwardly of the thread G, and the female thread H will be screwed onto the external thread $o$ of the valve until the seating-face $d$ on the end of the body makes tight engagement with the seating-face $p$ on the end of the valve. Then air can be pumped through the coupling without leakage, and the coupling can be detached by unscrewing the sleeve. In this latter use of the coupling the flange $i$ acts against the shoulder K to force the coupling against the valve, and this permits some relative shifting or yielding of the parts to compensate for any imperfection or irregularity in their construction or operation or in the seating-faces.

The sleeve L when loosely connected is normally drawn down over the thread G by gravity and hangs thereover, thus serving as a shield, protecting this thread from dirt and from injury. Its own thread H being an internal thread is sufficiently protected, but external threads used for this purpose are so liable to injury that the protection incident to my improvements is important.

It will be seen that my invention provides an improved coupling which can be readily and advantageously availed of, and it will be understood that the invention is not limited to the particular details of construction and arrangement set forth as constituting its preferred form, since these can be modified, or the invention can be employed according to such adaptations as circumstances or the judgment of those skilled in the art may dictate without departing from the spirit of the invention.

One modification is shown in the lower portion of Fig 4, wherein the sleeve lettered L′ is screw-threaded internally directly to its flange $i'$, and the shoulder K′ has an external screw-thread engaging this thread, so that it is necessary to rotate the sleeve and screw it to either its projected or retracted positions. In other respects the construction here shown is identical with that shown in Fig. 1.

What I claim is, in tire-valves and pump-couplings and analogous devices, the following-defined novel features and combinations, substantially as hereinbefore set forth, namely:

1. In a coupling, the combination of a body having an external thread G, an annular seating-face at front and at rear thereof, a cylindrical part $f$, and a shoulder beyond said rear seating-face and between said thread and said part $f$, and an axially-movable sleeve rotatively swiveled on said part $f$, having an internal screw-thread H of greater diameter than, passing freely over, and surrounding, said thread G, and an inward flange $i$ embracing said cylindrical part and engaging said shoulder, substantially as and for the purpose set forth.

2. A coupling consisting of a tubular member having a seating-face $d$, screw G, seating-face $e$, shoulder K, and cylindrical portion $f$, and adapted beyond the latter for attachment to a tube, in combination with a sleeve L having a thread H, a cylindrical interior $h$, and a flange $i$ traversed by an aperture $j$, said sleeve fixed to said member with its flange above said shoulder and its screw-thread surrounding the thread G of the latter.

In witness whereof I have hereunto signed my name in the presence of two subscribing witnesses.

GEORGE H. F. SCHRADER.

Witnesses:
GEORGE H. FRASER,
CHARLES K. FRASER.